United States Patent [19]

Hodge et al.

[11] Patent Number: 4,472,706

[45] Date of Patent: Sep. 18, 1984

[54] VEHICLE PRESENCE LOOP DETECTOR

[76] Inventors: Patrick M. Hodge, 31002 MacKenzie, Westland, Mich. 48185; Raymond J. Lipan, 14242 Farmington Rd., Livonia, Mich. 48154

[21] Appl. No.: 325,968

[22] Filed: Nov. 30, 1981

[51] Int. Cl.³ .............................................. G08C 1/01
[52] U.S. Cl. .................................. 340/941; 324/233; 340/51; 340/568; 340/939
[58] Field of Search .................... 340/38 L, 41 R, 551, 340/568, 51; 324/236, 226, 233, 263

[56] References Cited

U.S. PATENT DOCUMENTS

| | | | |
|---|---|---|---|
| 3,571,789 | 3/1971 | Midlock | 340/38 L |
| 3,868,626 | 2/1975 | Masher | 340/38 L |
| 3,911,389 | 10/1975 | Mills | 340/38 L |
| 4,075,563 | 2/1978 | Battle | 340/38 L |
| 4,296,401 | 10/1981 | Duley | 340/38 L |

*Primary Examiner*—James J. Groody
*Attorney, Agent, or Firm*—Andrew E. Pierce

[57] ABSTRACT

A vehicle presence detection system capable of detecting multiple entry and exiting comprising an electrical signal generating system comprising a tuned circuit having a magnetic field-producing induction loop for receiving a vehicle in proximity thereto to change the field configuration and corresponding signal resulting therefrom. Signals generated by said loop result from changes in the field of said loop and occur as a result of the entrance or exiting of a vehicle into or away from the proximity of the loop. A first or signal amplifier is used for amplification of the signal received from said loop. A second amplifier responds to positive or negative polarity input from said first amplifier to provide an output in response to a rapidly changing input which will activate a logic gate for sensing the polarity of said second amplifier output signal and producing a gated output signal.

20 Claims, 11 Drawing Figures

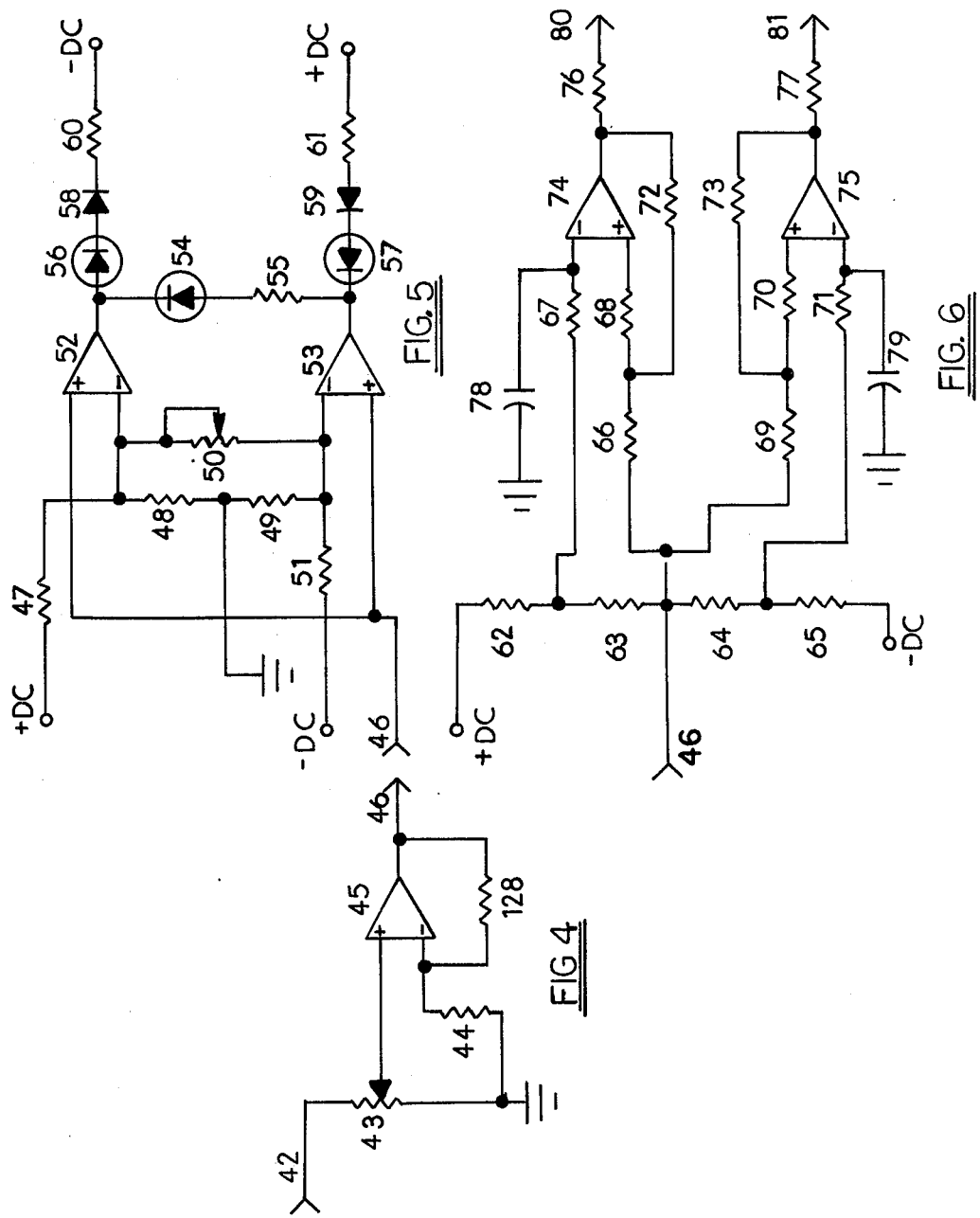

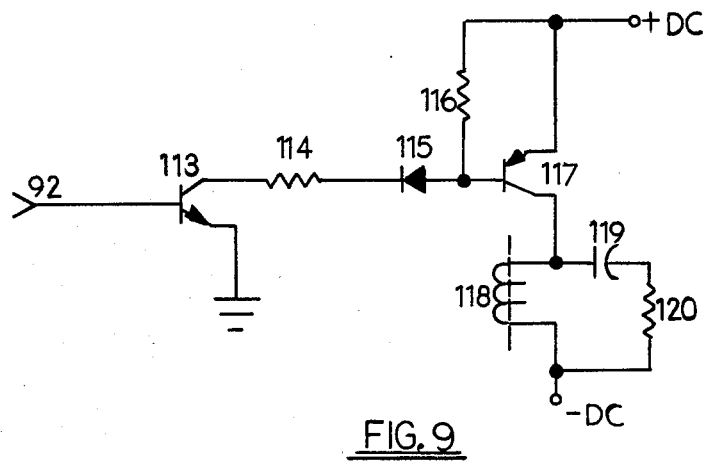
FIG. 9
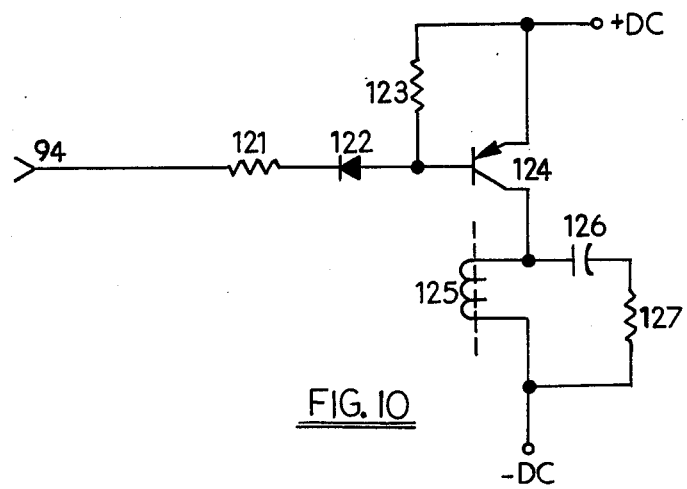
FIG. 10
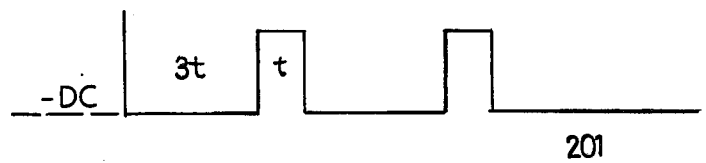
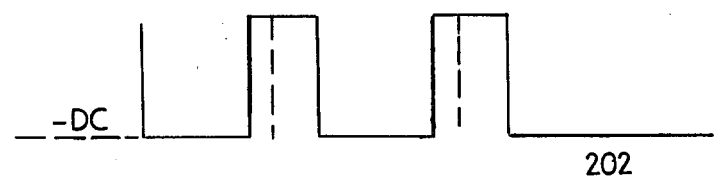
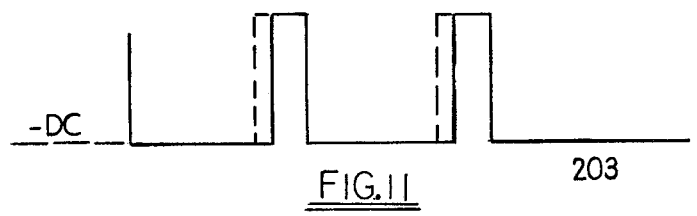
FIG. 11

VEHICLE PRESENCE LOOP DETECTOR

BACKGROUND OF THE INVENTION

1. Field of the invention

This invention relates to the field of detecting vehicles or other metallic objects by the positioning of an inductive loop on a travelled road or other surface wherein the inductive characteristics of the loop are varied when the metallic body of a vehicle or other metallic object moves into the magnetic field.

2. Description of the prior art

Inductive loop type vehicle presence detectors are known which employ detector means such as a phase detector to sense a signal which is passed through a phase shifting circuit including an inductive loop when a vehicle moves into the field of the loop. A change in the phase angle occurs upon the entry of the vehicle into the magnetic field of the inductive loop. Other presence detectors are known wherein an inductive loop is connected as a part of a tuned circuit for controlling the frequency of an oscillator. In such a system when a vehicle enters the field of the loop, the inductance value of the loop will vary to change the frequency of the oscillator. A change in the oscillator frequency is sensed to provide an output signal in a system such as this. A common failing of most of the prior art systems is the failure to sense the presence over a long period of time of a vehicle in the area of the loop.

Midlock in U.S. Pat. No. 3,571,789 discloses a vehicle presence loop detector for sensing the presence of a vehicle substantially without time limitation so long as the vehicle remains substantially within the confines of the loop. In the system disclosed by Midlock, it is apparent that the vehicle must first enter the area of the loop in order to activate the system to sense the exiting of a vehicle from the area of the loop. In addition, such a detector is disabled by a power failure after which the presence of the vehicle or object is lost and must be reestablished, upon restoration of power, by re-entering the loop.

Another vehicle detection system for detecting the presence of a vehicle which utilizes a change in impedence of a tuned circuit and corresponding phase shift as a metallic object moves into the magnetic field of the inductive loop is Marcinkiewicz, U.S. Pat. No. 3,500,310. In this system, the sudden change of voltage which occurs as a metallic object moves into the proximity of the inductive loop is stored in a storage element and simultaneously the discharge circuit for the storage element which is present in such a system is disabled. Such a system is capable of detecting the presence of a vehicle in a detection zone for a long period of time extending over many hours but is limited by the leakage of the capacitance means utilized as a storage element so that detection of a vehicle or other metallic object in the detection zone is not possible for an indefinite period of time.

It is an object of this invention to provide an improved vehicle detector that is capable of operating in either of two modes, namely a mode which detects the entry of a vehicle or other metallic object into a detection zone and a second mode in which the exiting of a vehicle or other metallic object from a detection zone is determined over an indefinite period of time. The loop detection system of the present invention is particularly suited for use as a security alarm system since the detector system of the invention can be tuned with a vehicle in the presence of the loop or off the loop. In addition, said detector system in the event of electrical power outage will maintain the initial static tuned condition (presence or absence of vehicle or object) upon restoration of power.

Other loop detector systems employing phase detectors as a means of detecting the presence of a vehicle in the vicinity of the inductive loop are U.S. Pat. No. 3,900,829; U.S. Pat. No. 3,587,040; and U.S. Pat. No. 3,870,990.

BRIEF DESCRIPTION OF THE DRAWINGS

FIG. 4 is a schematic diagram of a signal amplifier according to the block diagram of FIG. 1.

FIG. 5 is a schematic diagram of a light emitting diode (LED) control amplifier according to the block diagram of FIG. 1.

FIG. 6 is a schematic diagram of a by-directional input control amplifier according to the block diagram of FIG. 1.

FIG. 9 is a schematic diagram of a driver and output relay (momentary) according to the block diagram of FIG. 1.

FIG. 10 is a schematic diagram of a driver and output relay (timed) according to the block diagram of FIG. 1.

FIG. 11 is a series of graphs showing changes which occur in the pulse width interval in response to changes in the signal received from the field of the loop as a vehicle or object enters or exits from the vicinity of the loop, as compared to the signal received from the field in a resting condition.

SUMMARY OF THE INVENTION

Figure 1:
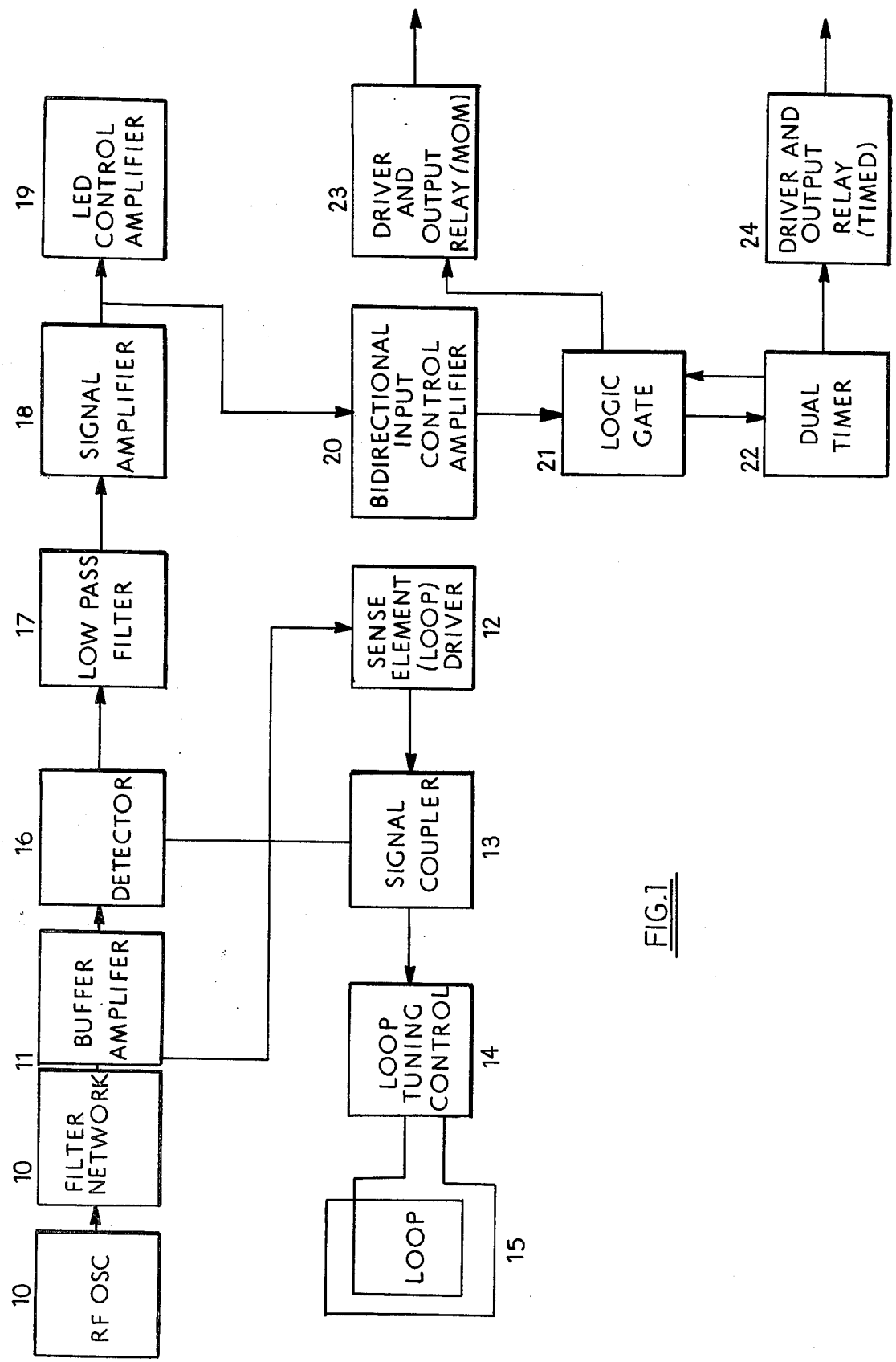
FIG. 1 is a simplified block diagram of one embodiment of the system according to the invention.

The invention relates to a vehicle presence loop detector which is capable of operating in either one of two modes, namely a first mode in which the presence of a vehicle entering an induction loop detection zone is sensed by a detection means. A rapid change in the magnetic field configuration of an inductive loop located in a fixed position caused as a vehicle or metallic object enters or exits the vicinity of the magnetic field configuration of said inductive loop produces a change in inductance which is sensed by a detection means such as a phase comparator-detector or an amplitude, frequency, pulse counting or pulse width modulation detector. The output direct current signal is transmitted to a first direct current amplifier means and thereafter to a second amplifier means which can utilize bidirectional input and which produces an output signal which activates a means for sensing the signal polarity of said second amplifier and for producing a gated output signal which can be used to de-energize normally energized relays having isolated contacts for controlling the activation of warning devices such as electric lights, sirens, telephone dialers, etc. A third amplifier means is provided for amplification of the signal from the first amplifier means to provide a signal utilized in tuning the loop detector. Slow changes in the magnetic field configuration of the inductive loop caused by atmospheric changes such as snow or rain falling in proximity to the magnetic field of the inductive loop are not sensed by the vehicle presence detector so as to cause false detection indication.

The vehicle presence detector of the invention can sense the exiting as well as the entrance of a vehicle or other metallic objects from or into the vicinity of a detection zone containing an inductive loop. The exit or entry of a vehicle causes a change in the magnetic field configuration of the inductive loop thus producing a signal change which is converted to a change in level of the direct current signal in a given direction of change by a detection means such as a phase comparator-detector. Alternatively, other detection means can be utilized such as an amplitude, frequency, pulse counting, or pulse width modulation detector.

DETAILED DESCRIPTION OF THE INVENTION AND THE DRAWINGS

A feature of the device of the present invention is the operation of the device in either one of two modes. To set the device so as to operate as a vehicle presence detector to detect the presence of a vehicle or other metallic object entering the vicinity of the inductive loop, the device is tuned initially with no vehicle or metallic object in the presence of the loop. Alternatively when it is decided to operate the device as a vehicle presence detector to determine the exiting of a vehicle or other metallic object from within the presence of the inductive loop, the device is tuned initially with the vehicle present in the inductive loop. When the vehicle enters or leaves the loop, the change in field configuration of the inductive loop produces resulting signals caused, for instance, by a change in phase.

The vehicle presence loop detector of the invention is capable of detecting the presence or absence of a variety of metallic objects. Generally a metallic vehicle is detected. However, a wide variety of metallic objects containing metals both magnetic and non-magnetic, such metals as steel, iron, lead, tin, brass, copper, aluminum and other metals are detectable when objects made of these metals are of adequate size. Detection is accomplished by passing the metallic object into or out of the vicinity of a loop configuration which is either embedded in the earth or roadway or is attached to the surface thereof or any non-metallic surface.

The method of detection in one embodiment of the invention is based upon the phase characteristic of a parallel tuned resonant circuit comprising a variable capacitor and the inductance effect of a loop of current carrying wire. The tuned circuit of the vehicle presence loop detector of the invention is driven by a current that is constant in amplitude and phase and the voltage developed across the tuned circuit will reflect any change in the impedance of the resonant circuit. In operation the change in impedance of the circuit is dependent upon the inductance of the wire loop. The inductance of said loop will decrease when the magnetic flux of the loop intercepts a metallic object of sufficient size as the result of eddy currents induced in the metallic object. Conversely, the inductance of the loop will increase when a metallic object of sufficient size is removed from the magnetic field of the inductive loop. A variation in the inductance of the inductive loop will cause a change of phase to occur in the voltage developed across the resonant circuit. In one embodiment of the invention, the detection of a metallic object ultimately involves the deenergization of control relays so as to actuate sirens or other indicating devices connected thereto so as to signify a detection has been made.

The operating frequency of the vehicle presence loop detector of the invention is generated by an RF oscillator, preferably a crystal controlled oscillator. As part of said oscillator, a filter network filters out unwanted harmonics from the output of the crystal oscillator. The filtered signal from the output of the filter network is amplified by a buffer amplifier which drives two loads in parallel. One load is an input to the phase detector which senses a change in phase between a fixed frequency and a frequency, the phase of which is varied by the operating characteristics of the inductive loop. The second load is the capacitor at the input of the sense element driver stage. A constant current is supplied to the isolated tuned loop by the sense element driver. There are two input signals in the phase detector. One is obtained from the output of the buffer amplifier, the other input signal is obtained from the tertiary winding of the loop transformer. The two input signals are combined in the output of the phase detector. The time at which this composite signal is present in the output of the phase detector is proportional to the phase difference of the two input signals. The output of the phase detector is converted to DC by means of a low pass filter. Under static conditions (when a vehicle is neither leaving or entering the vicinity of the inductive loop) the DC voltage obtained from the filter provides a DC reference signal for the signal amplifier. The first or signal amplifier receives a DC input signal from the DC filter circuit. This signal is amplified and fed to both the light emitting diode (LED) control amplifier and a bi-directional input control second amplifier. A third amplifier, the LED control amplifier, receives a DC input signal from the signal amplifier. This input signal is compared to a DC reference voltage divider and causes one of the three LED's to light at a signal level which is over, under, or equal to the reference voltage. When the input signal and the reference voltage are equal within a pre-determined limit, the desired loop tuning condition has been accomplished, as indicated by the illumination of the respective LED.

The bi-directional input control amplifier, having two stages, also receives and amplifies a DC signal applied to each non-inverting input from the signal amplifier to said bi-directional amplifier. This is done by sampling a change across a resistor divider network while integrating that same signal on each inverting input of said amplifier stages. The bi-directional amplifier provides a detection on either a positive or negative excursion of the input signal voltage. The phase detector signal input which is obtained from the tertiary winding of the loop transformer will either lead or lag its reference condition depending on whether the metallic object or vehicle leaves or enters the loop area. This phase lead or lag results in either a positive or negative DC voltage change at the output of the DC filter relative to the reference condition. During the positive portion of either signal, saturation current is conducted through the phase detector transistor collector load resistors. When both input signals swing negative simultaneously, no current is conducted through the load resistors since a negative voltage on either transistor drives it into cut-off. A non-symmetrical square wave voltage is generated across the load resistors due to the initial 90° phase relationship between the two phase detector inputs in the static operating condition.

The average DC value of the square wave voltage is proportional to the relative phase between the two signals. When a metallic object or vehicle enters or leaves the loop area, the relative phase between the two signals deviates from the static condition and the time interval of saturation increases or decreases proportionally. A change in the relative phase between the two signals increases or decreases the pulse width at the phase detector load resistors. The average DC voltage output of the low pass filter is varied accordingly. The filter DC voltage output will also vary in response to phase differences caused by changing environmental conditions in the loop such as temperature, moisture, etc. or circuit component aging. The integrating time constant applied to the non-inverting inputs of the bidirectional amplifier will track slow changes in the input signal which represent the above environmental changes thereby cancelling the effect of this signal component. This provides constant tracking and cancellation of the environmental effects for both modes of operation allowing indefinite detection or true presence (object initially in the loop area) or detection of an object entering the loop area (loop area initially unoccupied). The more rapid signal excursions which are present when a metallic object or vehicle enters or leaves the loop area are amplified and coupled to an exclusive "or" gate which provides a control signal to the output relay driver and dual timer stages. This bi-directional amplifier arrangement will respond to either an open or shorted loop condition which is a desirable characteristic of a vehicle presence loop detector to allow it to be suitable for use as a security alarm device. Unidirectional movement of a metallic object or vehicle can be obtained by closure of the directional control switch which will cause detection of a metallic object or vehicle upon entering the loop area only.

Now referring to the invention in greater detail with respect to the various FIGS., there is shown FIG. 1 the invention in which a fixed frequency RF oscillator 10 such as a crystal controlled oscillator passes a signal to a buffer amplifier 11 by way of RF filter network 10'. The same frequency signal from buffer amplifier 11 is passed both to detector 16 and sense element (loop) driver 12. The signal from sense element driver 12 is passed to signal coupler 13 and loop tuning control 14 wherein a coupling transformer in signal coupler 13 and capacitors or a variable capacitor in loop tuning control 14 are used for purposes of driving and tuning the circuit which includes inductive loop 15. Loop 15 is oriented beneath the surface of a road or other area travelled by a vehicle. Sense element driver 12, signal coupler 13, loop tuning control 14 and inductive loop 15 form a tuned network, the output of which is passed from signal coupler 13 to detector 16. The loop tuning control 14 adjusts the output signal developed across tuned loop 15 so as to set the desired normal signal relation to that of the buffer amplifier 11. The loop tuning control 14 permits the signal relation of the output of the buffer amplifier 11 and the tuned loop 15 to be such as to establish the desired direct current static voltage level in the detector 16. The entry of a vehicle into the presence of loop 15 or the exiting of a vehicle from within the presence of loop 15 produces a signal change which is converted to a change in level of the direct current signal by the detector 16. The output signal from detector 16 is transmitted to a low pass filter 17 and a first or signal amplifier 18.

Figure 2:
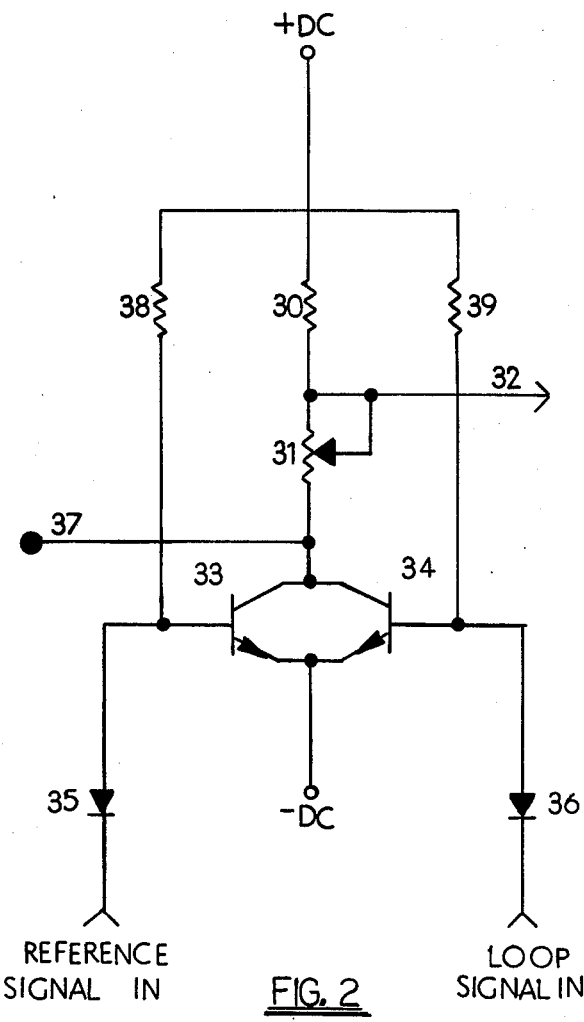
FIG. 2 is a schematic diagram of a phase detector according to the block diagram of FIG. 1.

Referring now to FIG. 2, there is shown schematically detector means 16 shown in FIG. 1 having two inputs and an output. Utilizing an oscilloscope connected at the inputs of a phase detector means sinusoidal wave forms can be obtained. These wave forms are obtained by coupling through diodes 35 and 36 respectively to the phase detector transistors 33 and 34. When loop 15 has been initially tuned, either with a vehicle in the presence of the inductive loop 15 or when no vehicle is in the presence of loop 15, the input wave forms will be approximately 90° out of phase. During the positive portion of either input signal, saturation current is conducted through potentiometer 31 and resistor 30 dividing between both transistors 33 and 34. When both input wave forms swing negative simultaneously, no current is conducted through potentiometer 31 and resistor 30 since both transistors 33 and 34 are now driven into cut-off. This action produces the wave form shown in FIG. 11. The average DC value of the wave form is proportional to the relative phase between the two signals. Potentiometer 31 is adjusted to produce a DC voltage level at the output of the low pass filter 17 shown in block diagram of FIG. 1 which is at virtual circuit common potential in the initial static condition. Resistors 38 and 39 provide base bias current paths for transistors 33 and 34 respectively.

Figure 3:
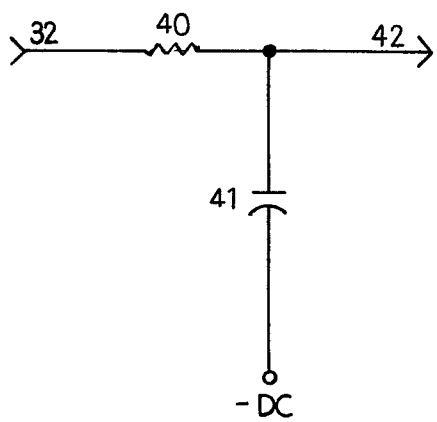
FIG. 3 is a schematic diagram of a low pass filter according to the block diagram of FIG. 1.

Referring now to FIG. 3 there is shown therein a schematic diagram of the low pass filter 17 shown in FIG. 1 which functions to attenuate the AC component of the wave form received from the phase detector means retaining only a DC voltage which is proportional to phase. The wave form is passed to low pass filter 17 through conductor 32. Resistor 40 and capacitor 41 constitute a smoothing filter which attenuates the AC component of the wave form and retains only a DC voltage which is proportional to phase. The DC voltage is passed to the signal amplifier 18 through conductor 42.

Referring now to FIG. 4 there is shown therein a schematic diagram of the signal amplifier 18 shown in FIG. 1 in which the DC voltage from low pass filter 17 is applied to variable gain control 43. The wiper of the gain control is tied to the non-inverting input of amplifier 45. Resistors 44 and 128 supply the common reference and fixed gain for the amplifier. The DC voltage output conductor 46 will be at essentially circuit common potential in the static condition. The signal voltage on conductor 42 will vary more positive or negative in response to either operating the tuning control switches in loop tuning control 14 during initial loop tuning or as a result of moving a metallic object such as a vehicle into or out of the loop area after tuning has been accomplished. This signal change is applied to the non-inverting input of amplifier 45 by way of the gain control 43 so as to produce a corresponding amplified signal output on conductor 46. The amount of signal output available on conductor 46 will vary with the setting of the gain control potentiometer 43 which determines how much signal must be present to cause a detection state to exist.

Referring now to FIG. 5 there is schematically represented therein the light emitting diode (LED) control amplifier 19 shown in FIG. 1 which receives an input DC voltage signal from signal amplifier 18 through conductor 46 to the non-inverting input of comparators 52 and 53. The signal voltage level is compared to the DC reference voltage applied to the inverting inputs of comparators 52 and 53 which has been established by symmetrical voltage divider resistors 47, 48, 49, 50, and 51. The voltage divider is center tapped to circuit common potential so as to provide a DC reference voltage on the inverting input of comparator 52 so as to render this positive with respect to circuit common potential, as indicated by the voltage drop across resistor 48. The voltage applied to the inverting output of comparator 53 will be negative with respect to the circuit common potential as measured by the amount of voltage drop across resistor 49. Potentiometer 50 provides a symmetrical "window" of adjustment for sensitivity control. The outputs of comparators 52 and 53 are tied to light emitting diodes 54, 56, and 57 which are used to indicate the level and the polarity of the input signal voltage relative to the DC reference voltage applied to comparator 52 and 53. Resistors 55, 60 and 61 limit the LED current to the proper value while diodes 58 and 59 protect the LED's from excessive reverse voltage while in the off state. The DC voltage level on line 46 will be at essentially circuit common potential in the static tuned state (with an object present in the vicinity of loop 15 or no object present). During this condition, the output voltage state of comparators 52 and 53 will be negative and positive respectively. This will cause current conduction through LED 54 and resistor 55 and LED 54 will be illuminated. This condition signifies the desired normal tuned condition with the loop tuned to the applied frequency. As the loop tuning control 14 selector switches are rotated through their various positions, a corresponding phase shift will occur at the phase detector means and a subsequent positive or negative DC signal level change will appear on conductor 46. If the signal has gone more positive (for instance, leading phase angle, the loop is tuned to a frequency lower than the applied frequency) the output state of comparator 52 will reverse thus extinguishing LED 54 and illuminating LED 56. The state of comparator 53 will remain unchanged. If the signal goes more negative (for instance a lagging phase angle, the loop tuned to a frequency higher than the applied frequency) the output state of comparator 53 will reverse so as to extinguish LED 54 and cause LED 57 to become illuminated instead of LED 56. The state of comparator 52 will remain unchanged. Proper loop tuning is facilitated by the LED switching action.

Referring now to FIG. 6 there is shown a schematic diagram of the bi-directional input second amplifier 20 which receives a DC voltage input signal from the first or signal amplifier 18 by way of conductor 46 at the junction of resistor 63 and 64. A symmetrical voltage divider consisting of resistors 62, 63, 64, and 65 sets the reference voltage applied to amplifier stages 74 and 75. Capacitor 78 and resistor 67 provide the integrating time constant for amplifier stage 74, while resistors 66 and 72 supply hysteresis (positive feedback) to prevent relay chatter in driver and output relay (momentary) 23. Resistors 67 and 68 also balance the offset voltages produced by the amplifier input bias currents. Capacitor 79 and resistor 71 constitute the integrating time constant for amplifier stage 75. Resistor 69 and resistor 73 provide hysteresis while resistors 70 and 71 satisfy the input bias current conditions. Resistors 76 and 77 are output current limiting resistors and the amplifier outputs are fed via lines 80 and 81 to the logic gate 21. In the static tuned condition of the vehicle presence loop detector, the voltage drop across resistor 63 is of such polarity as to make the inverting input of amplifier stage 74 more positive with respect to the non-inverting input. Under this condition the output of amplifier stage 74 will be held at a high negative potential. The voltage drop across resistor 64 is of such polarity as to make the non-inverting input of amplifier stage 75 more positive with respect to the inverting input. The output of amplifier stage 75 will then be held at a high positive potential. These output voltage levels are fed on conductors 80 and 81 respectively to the logic gate 21. As long as these output voltage levels are of opposite polarity with respect to each other this condition represents a non-detection state. As the condition of the loop 15 is altered from its static tuned state, a phase shift will occur at the input to the phase detector means and a subsequent positive or negative DC signal level change will occur on conductor 46. The polarity of the signal will depend upon which mode of operation is being used. If the static tuned condition reflects an occupied loop mode, then a positive signal will result as the vehicle or other metallic object leaves the loop area. If the static tuned condition reflects an unoccupied loop mode, then a negative signal will result as the object or vehicle enters the loop area. Assuming a positive input signal condition, the non-inverting input of each amplifier would go more positive than its previously stated condition. Since the non-inverting input on amplifier stage 75 was previously positive with respect to its inverting input, the output state of amplifier stage 75 will not change. However the non-inverting input on amplifier stage 74 would be allowed to go more positive than the inverting input by the action of the integrating time constant (capacitor 78 and resistor 67). This causes the output of amplifier stage 74 to change state to a high positive potential. At this time the outputs of both amplifier stages 74 and 75 will hold momentarily at a high positive potential which represents a detection condition. This condition is maintained until the integrating time constant allows the voltage at the inverting input of amplifier stage 74 to adjust to the voltage change at which time the inverting input will again be more positive than the non-inverting input and the output of amplifier stage 74 will switch back to its high negative potential. Assuming a negative input signal condition, the polarity of the voltage on the inputs of amplifier stage 74 will not cause any switching action to occur and thus the output of amplifier stage 74 will remain at a high negative potential. The non-inverting input of amplifier stage 75 will go more negative than the inverting input which is affected by the integrating time constant (capacitor 79 and resistor 71). This will cause the output of amplifier stage 75 to switch to a high negative potential. At this time the output of both amplifier stages 74 and 75 will be held momentarily at a high negative potential which also represents a detection condition. This condition will exist until the integrating time constant allows the voltage at the inverting input of amplifier stage 75 to adjust to the voltage change at which time the inverting input will again become more negative than the non-inverting input and the output of amplifier stage 75 will switch back to its high positive potential. It will be noted that a detection state exists when the outputs of amplifier stages 74 and 75 are the same polarity whether positive or negative. The integrating resistor-capacitor combinations associated with both amplifier stages 74 and 75 allows the voltage on the respective inverting inputs to closely track any slow voltage change appearing on the respective non-inverting inputs such as is produced by environmental changes or component aging. This action prevents false detections from occurring as the result of environmental drift of temperature for both modes of operation.

Figure 7:
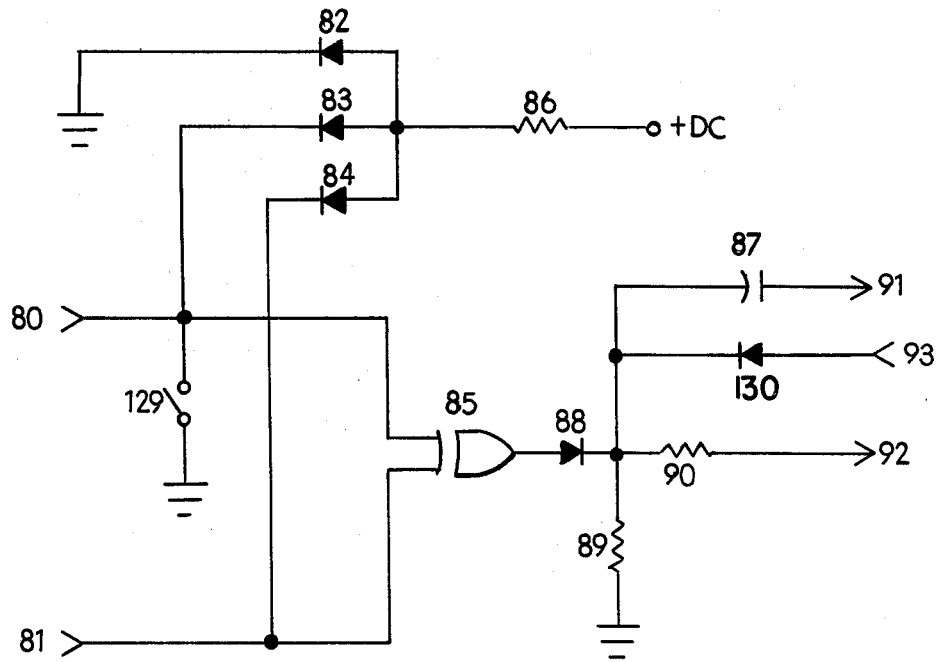
FIG. 7 is a schematic diagram of a logic gate according to the block diagram of FIG. 1.

Referring now to FIG. 7 there is shown therein a schematic diagram of logic gate 21 which receives an input from the bidirectional input control amplifier 20 by way of conductors 80 and 81. Diodes 82, 83, 84, and resistor 86 protect the exclusive "or" gate 85 from excessive negative voltage on the inputs. Diodes 88 and 130 isolate the two drive sources, namely logic gate 85 and conductor 93, for the drive transistor 113 of driver and output relay (momentary) 23 shown in FIG. 1 which is supplied through current limiting resistor 90 by way of conductor 92. Capacitor 87 and resistor 89 provide the trigger input circuit for the dual timer 22 by way of conductor 91. Switch 129 is used to inhibit the output of amplifier stage 74 and to provide unidirectional detection operation. In the static tuned state, the inputs to the exclusive "or" gate 85 are held at a high negative and positive potential on conductors 80 and 81 respectively. The characteristic of the exclusive "or" gate 85 is such that if either input is at a positive potential, the output will also be at a positive potential which in turn supplies the drive voltage for conductor 92 through current limiting resistor 90. If a detection state occurs, both input conductors 80 and 81 will be momentarily either positive or negative simultaneously which is determined by the operating mode, and which will cause the "or" gate 85 output to switch to a negative potential for that time interval. At this time, the drive voltage will be removed from conductor 92. As the "or" gate 85 output makes a transition from positive to negative, a momentary negative going signal will be supplied by way of resistor 89 and capacitor 87 on conductor 91.

Figure 8:
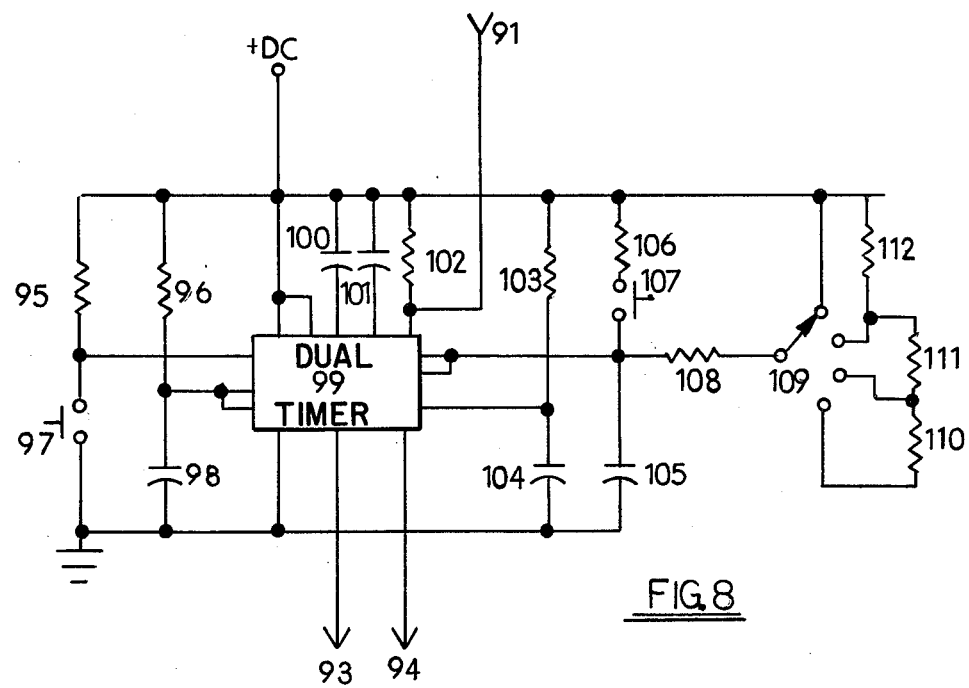
FIG. 8 is a schematic diagram of a dual timer circuit according to the block diagram of FIG. 1.

Referring now to FIG. 8 there is shown dual timer circuit 22 shown in FIG. 1 which contains two functionally independent timers each having its own input, output and reset and control connections. One section of the timer is used to control the timed output relay operation and the other section controls the delay function which inhibits the de-energization of both output relays for a predetermined time interval. Switch 97 and resistor 95 control the trigger input to the delay timer section, capacitor 98 and resistor 96 determines the reset time interval. Integrated circuit dual timer 99 contains two functionally independent timers. Capacitor 100 acts as a noise filter for the unused control input. The output from this section is fed by way of conductor 93 to the logic gate 21 and is the second drive source referred to in FIG. 7. Capacitor 104 and resistor 103 provide a power-up reset on the relay control section. Capacitor 105, resistors 108, 110, 111, 112, and switch 109 control the variable reset time interval for this section. Switch 107 and resistor 106 provide an alternate quick reset capability. Resistor 102 in conjunction with resistor 89 and capacitor 87 in FIG. 7 control the trigger input on this section by way of conductor 91. Capacitor 101 is employed as a noise filter on the unused control input. The output from this section is fed by way of conductor 94. In the static tuned condition, the outputs of both timer sections are at circuit common potential. When a detection occurs, the negative going transition appearing on conductor 91 causes the output on conductor 94 to switch to a high positive potential. This action causes de-energization of the driver and output relay (timed) 24. If the delay switch 97 is momentarily depressed, a negative going transition occurs at the trigger input of the delay section. At this time, conductor 93 will switch to a high positive potential which will supply a second drive source through diode 130 in FIG. 7 to the junction of diodes 130 and 88 resistors 89 and 90 and capacitor 87, all in FIG. 7. A high positive potential at this junction will maintain conduction through both output relays thus inhibiting relay switching even if a detection state should occur. The timer outputs will reset back to their static condition in a time interval determined by the respective reset input time constant.

Referring now to FIG. 9, there is shown therein schematically the driver and output relay 23 shown in FIG. 1. The momentary driver and output relay 23 receives an input by way of conductor 92. Switching transistor 113 controls the conduction of transistor switch 117 through current limiting resistor 114, biasing resistor 116 and diode 115. Transistor 117 controls the operation of relay 118, the contacts of which are used to control signaling devices to alert a user that a detection has been made. Capacitor 119 and resistor 120 damp the inductance of relay 118 to reduce ringing and voltage overshoot and also guard against relay chatter as a result of coupling and amplification of 60-cycle line voltage. In the static tuned condition, the voltage input on line 92 is of such polarity as to cause saturation current of switching transistor 113 to flow through resistor 114, diode 115, biasing resistor 116 and into the base of transistor switch 117. Under this condition transistor switch 117 is driven into saturation and conducts current through relay 118 holding it in an energized state. When a detection occurs conductor 92 will switch to circuit common potential. At this time switching transistor 113 will turn off. This will also turn off transistor switch 117 and relay 118 will be de-energized. This condition will exist for the period of time that conductor 92 remains at circuit common potential.

Referring now to FIG. 10, there is shown therein schematically the driver and output relay 24 shown in FIG. 1. The driver and output relay (timed) 24, receives an input by way of conductor 94. Current limiting resistor 121 and biasing resistor 123 as well as diode 122 provide the base current path for transistor switch 124. Switch 124 controls the operation of relay 125, the contacts of which are used to control signaling devices which indicate to the user that a detection has been made. Capacitor 126 and resistor 127 damp the inductance of relay 125 to reduce ringing and voltage overshoot and also guard against relay chatter as a result of coupling and amplification of 60-cycle line voltage. In the static tuned condition, conductor 94 is held at circuit common potential. Base current for transistor switch 124 flows through resistors 121, 123, and diod 122. Saturation current in transistor switch 124 flows through relay 125 holding it in the energized state. When a detection occurs, conductor 94 will be at a high positive potential. This will result in the removal of base current from transistor switch 124 thus driving it into cut-off. Relay 125 will then be de-energized and will remain in this state until conductor 94 is restored to the static condition.

Referring now to FIG. 11, there are represented wave forms which would be obtained by attaching an oscilloscope at conductors 37 and 32 of FIG. 2. Phase detector output wave form 201 represents the condition of the vehicle presence loop detector when the loop 15 has been initially tuned either with a vehicle present in the vicinity of said loop 15 or with no vehicle present in the vicinity of said loop 15. Wave form 201 shows the input wave forms to be approximately 90° out of phase during this condition. The wave form 202 shows the change in phase upon an object leaving the loop where the vehicle presence loop detector has been initially tuned with a vehicle or other object in the presence of loop 15. Wave form 203 shows the change in phase which occurs when the loop 15 has been initially tuned with no vehicle or other metallic object in the presence of loop 15 and a vehicle or other metallic object has subsequently entered the vicinity of loop 15.

The loop detector of the invention can utilize circuitry that detects frequency, amplitude, pulse counting, or pulse width modulation changes instead of the above-described phase detection circuits. Such alternative circuitry would be known to one skilled in this art. The visual indicators in LED control amplifier 19 shown in FIG. 1 also could be replaced by other conventional indicating means such as an indicating meter with zero at the center of the scale or a segmented digital display wherein some digit would signify (arbitrarily) a tuned condition. The bi-directional input control amplifier 20 and the logic gate 21 shown in FIG. 1, could be replaced by a conventional microprocessor with associated known circuitry to receive the analog voltage signal and perform all the logic and control functions. The output relays 23 and 24 shown in FIG. 1 could be of conventional solid state type instead of electro-mechanical, as described above.

From the foregoing it can be appreciated that the invention has been described and illustrated with respect to certain particular preferred embodiments which give satisfactory results, but it will be understood by those skilled in this art that various changes and modifications can be made without departing from the spirit and scope of the invention and it is intended therefore to cover in the appended claims all such changes and modifications.

We claim:

1. A metallic object presence detector capable of detecting multiple entry and exiting, of maintaining true presence detection for an indefinite period of time, and of operating in either one or both of two modes namely, one mode in which the detector is capable of detecting the entry of said object and a second mode in which the detector is capable of detecting the removal of said object comprising:
A. electrical signal generating means comprising a tuned circuit means and tuning indicator means, said tuned circuit having at least one magnetic field-producing induction loop for receiving said metallic object in proximity thereto to change the field configuration and corresponding signal resulting therefrom,
B. detector means which receives a signal from said loop,
C. signal amplifier means to amplify the signal from said detection means,
D. bi-directional amplifier means which responds only to positive and negative polarity rapidly changing signals from said signal amplifier means which signals are caused by movement of a metallic object into or out of the area of said loop, said bi-directional amplifier means further comprising:
(1) dual amplifier stage means each having output voltages of opposite polarity in a non-detection state and the same polarity, whether positive or negative, in a detection state, and co-acting therewith (2) dual resistor-capacitor means which momentarily pass said rapidly changing signals from said signal amplifier means to said dual amplifier stage means so as to change the output voltage polarity of one of said dual amplifier stage means,
E. means for sensing the signal polarity of the output signal from said bi-directional amplifier means to produce a pulsed, gated output signal, and
F. means for receiving said pulsed, gated signal to produce an indication of presence or absence of said object in the vicinity of said loop.

2. The presence detector of claim 1 wherein said electrical signal generating means has an output which drives two loads in parallel; a first load for applying an energizing voltage to said loop and a second load for directly applying an energizing voltage to said detector means to thereby provide a reference voltage to said detector means.

3. The presence detector of claim 1 wherein said detector means is a phase detector.

4. The presence detector of claim 3 wherein said phase detector has two inputs and one output wherein a first input receives a signal from said loop and a second input receives a reference voltage from said electrical signal generating means.

5. The presence detector of claim 4 wherein said detector means includes a low pass filter.

6. The presence detector of claim 1 wherein said detector means is an amplitude detector.

7. The presence detector of claim 1 wherein said detector means is a frequency detector.

8. The presence detector of claim 1 wherein said detector means is a pulse width detector.

9. The presence detector of claim 1 wherein said detector means is a pulse counting detector.

10. The presence detector of claims 3, 6, 7, 8, or 9 wherein said bi-directional amplifier means responds only to rapid electrical signal changes of either positive or negative polarity received from said signal amplifier means, said rapid changes being more rapid than signal changes caused by environmental changes.

11. The presence detector of claim 10 wherein said resistor and capacitor means is in series and filters out slow changes in the signal from said signal amplifier means caused by environmental changes.

12. The presence detector of claim 11 wherein said means for receiving said gated signal can be at least one control device.

13. The presence detector of claim 12 wherein said control device is a relay or a timer.

14. The presence detector of claim 13 wherein said tuning indicator means consists of at least one on-off indicator.

15. The presence detector of claim 14 wherein said on-off indicator consists of visual or audible indicator means.

16. The presence detector of claim 15 wherein said indicator means is visual and consists of LED indicator means.

17. The presence detector of claim 13 wherein said bi-directional amplifier means responds to a shorted loop condition by generating a positive polarity signal sufficient to provide a detection state.

18. The presence detector of claim 13 wherein said bi-directional amplifier means responds to an open loop condition by generating a negative polarity signal sufficient to provide a detection state.

19. The presence detector of claim 1 wherein said tuned circuit means is tuned with at least one object in said loop to allow operation of said presence detector in an exiting mode.

20. The presence detector of claim 1 wherein said tuned circuit means is tuned with no object in said loop to allow operation of said presence detector in an entering mode.

* * * * *